United States Patent [19]

Noonan et al.

[11] Patent Number: 5,531,277
[45] Date of Patent: Jul. 2, 1996

[54] BENT WING SWEEP

[75] Inventors: James T. Noonan, Johnston; Warren L. Thompson, Elkhart, both of Iowa

[73] Assignee: Deere & Company, Moline, Ill.

[21] Appl. No.: 413,312

[22] Filed: Mar. 30, 1995

[51] Int. Cl.⁶ .................................................. A01B 35/20
[52] U.S. Cl. ............................ 172/730; 172/724; 172/770
[58] Field of Search ..................................... 172/721, 722, 172/724, 730–733, 765, 770, 768; 101/124, 152, 186–188

[56] References Cited

U.S. PATENT DOCUMENTS

| | | | |
|---|---|---|---|
| 233,058 | 10/1880 | Wood | 172/721 |
| 709,147 | 9/1902 | Fay | 172/730 |
| 1,648,843 | 11/1927 | Francis | 172/733 |
| 1,982,746 | 12/1934 | Kovar | 172/724 |
| 2,739,519 | 3/1956 | Pledger et al. | 97/198 |
| 2,849,940 | 9/1958 | Haynes | 172/770 |
| 2,857,834 | 10/1958 | Hirasuna | 97/144.1 |
| 2,889,788 | 6/1959 | Van Dorn | 172/730 |
| 2,918,132 | 12/1959 | Neikerk et al. | 172/770 |
| 2,924,286 | 2/1960 | Franzen | 172/194 |
| 3,038,424 | 6/1962 | Johnson | 172/724 |
| 3,152,649 | 10/1964 | Arnold | 172/730 |
| 3,217,814 | 11/1965 | Leduc | 172/709 |
| 4,026,367 | 5/1977 | Tibbs | 172/730 |
| 4,580,639 | 4/1986 | Johnson | 172/730 |
| 4,583,599 | 4/1986 | Anderson | 172/730 |
| 4,770,112 | 9/1988 | Neumeyer | 172/724 |
| 4,850,435 | 7/1989 | Morris et al. | 172/730 |
| 5,437,337 | 8/1995 | Dietrich, Sr. | 172/724 |

FOREIGN PATENT DOCUMENTS

| | | | |
|---|---|---|---|
| 74413 | 7/1952 | Denmark | 172/770 |
| 667456 | 3/1935 | Germany | 172/730 |
| 17097 | 4/1927 | Netherlands | 172/730 |

Primary Examiner—Spencer K. Warnick, IV

[57] ABSTRACT

A cultivator sweep includes a body with a forward point and wings diverging outwardly in the rearward direction. In one embodiment, a row side sweep includes a row side wing angled upwardly from the horizontal at an angle of approximately 27 degrees, and the opposite wing is angled downwardly, to closely match the profile of the ground from the row bed to the row middle. In another embodiment of the invention, a wide sweep extends between the beds of adjacent rows and includes wings with outermost portions bent upwardly at an angle with respect to the horizontal to provide a sweep profile which closely approximates the ground profile between the rows for more uniform depth of penetration, less soil throw and crop root damage, and reduced draft. The sweep configuration, wherein a fore-and-aft extending line connecting a point anywhere on the leading edge of a sweep wing with a corresponding point on the trailing edge of the wing lies at a substantially constant angle relative to a horizontal plane, provides constant soil lift regardless of soil contact point along the leading edge. The sweep configuration therefore provides soil flow characteristics similar to those of a conventional flat sweep.

23 Claims, 4 Drawing Sheets

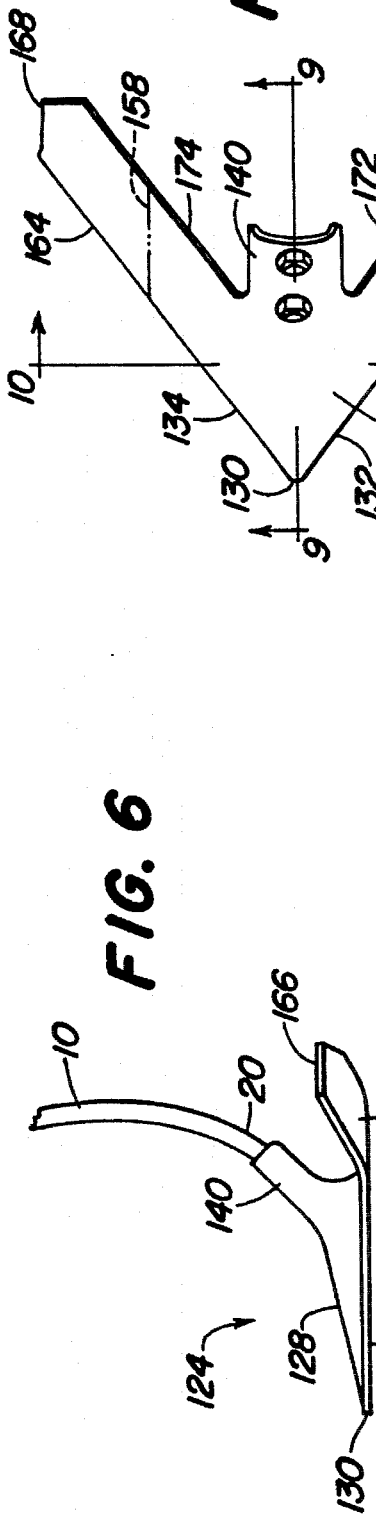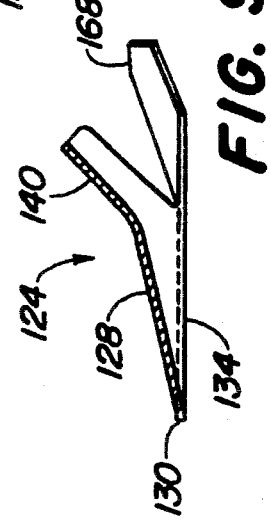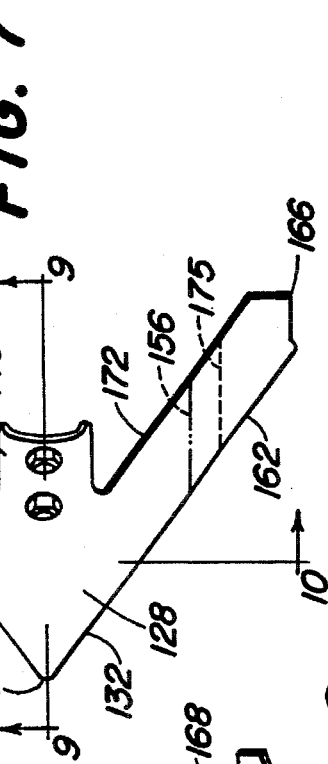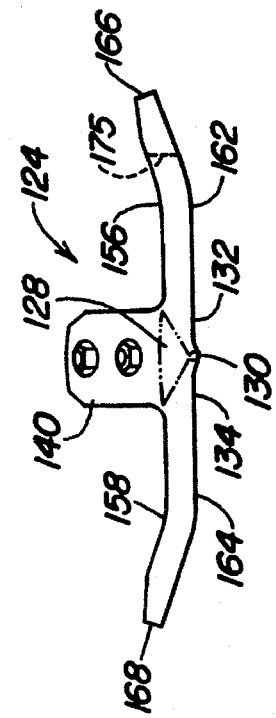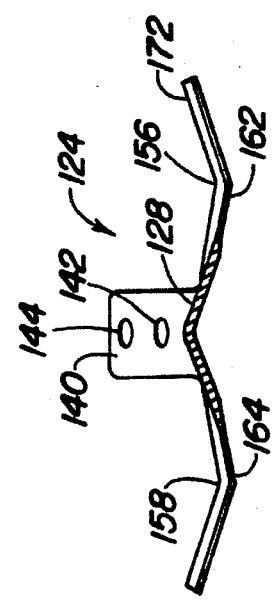

BENT WING SWEEP

BACKGROUND OF THE INVENTION

1) Field of the Invention

The present invention relates generally to row crop cultivators and, more specifically, to a sweep having a profile which is similar to that defined by the plant beds and the middle area between the rows that are cultivated.

2) Related Art

A typical single shank row crop cultivator today utilizes a system with either a single flat sweep or a point and double share to work the soil between rows. The ends of a conventional cultivator sweep disturb a considerable amount of soil near the row necessitating some form of shielding to protect the plants and resulting in decreased productivity because cultivation speeds have to be lower and draft is increased. Cut-away disks may be provided in addition to the sweep system so that a narrow cultivating band is possible to assure weed kill near the row. However, the disks are heavy and expensive and can require much maintenance.

The profile of the area between rows of plants is often shallow in the center and raised adjacent the rows so that deep cultivation takes place adjacent the row while the center area is cultivated too shallowly. To get needed depth between rows, the area near the rows has to be cultivated relatively deeply. The deep cultivation near the rows not only increases soil throw and draft, but at times causes damage to plant roots. Because the row-side wing runs deeper in the soil than the opposite or middle-side wing, side loading and shank pivot loading are increased. Valuable moisture may also be lost near the row by the deep tillage. In certain crops, particularly small crops like beets which require a very exact row spacing for harvesting, the sweeps can actually cause problematic row shifting during cultivation.

BRIEF SUMMARY OF THE INVENTION

It is therefore an object of the present invention to provide an improved cultivator sweep which overcomes most or all of the aforementioned problems. It is a further object to provide such an improved sweep which more closely matches the profile of the ground area between adjacent rows of plants being cultivated and facilitates cultivation near the row without root damage from the sweep wing or plant damage from soil throw.

It is a further object of the present invention to provide an improved cultivator sweep which disturbs less soil adjacent the row than a conventional flat sweep. It is a further object to provide such a sweep which reduces plant root damage while providing good weed kill near the row. It is another object to provide such a sweep which closely matches the ground profile for uniform depth of penetration between rows of crop and reduced side loading and shank pivot loading.

It is still another object of the present invention to provide an improved sweep which, compared to conventional sweeps, permits increased cultivation speeds, reduces soil throw and moisture loss, and reduces the need for plant shielding.

A cultivator sweep constructed in accordance with the teachings of the present invention includes a body with a forward point and wings diverging outwardly in the rearward direction. In one embodiment, a row side sweep includes a row side wing angled upwardly from the horizontal at an angle of approximately 27 degrees, and the opposite wing is angled downwardly to closely match the profile of the ground from the row bed to the row middle. In another embodiment of the invention, a wide sweep extends between the beds of adjacent rows and includes wings with outermost portions bent upwardly at an angle with respect to the horizontal to approximate the ground profile between the rows for more uniform depth of penetration, reduced soil throw and moisture loss, less crop root damage, and reduced draft.

The sweeps have a unique bent wing configuration wherein a fore-and-aft extending line connecting a point anywhere on the leading edge of a sweep wing with a corresponding point on the trailing edge of the wing lies at a substantially constant angle relative to a horizontal plane to provide constant soil lift regardless of soil contact point along the leading edge. The improved sweeps provide a conventional soil flow similar to that of a flat sweep and permit cultivation closer to the plant without plant damage or destruction of the desired bed profile.

These and other objects, features and advantages of the present invention will become apparent to one skilled in the art upon reading the following detailed description in view of the drawings.

BRIEF DESCRIPTION OF THE DRAWINGS

FIG. 6 is a side view of the sweep of FIG. 5.

FIG. 7 is a top view of the sweep of FIG. 6.

FIG. 8 is a front view of the sweep of FIG. 7.

FIG. 9 is a sectional view taken generally along lines 9—9 of FIG. 7.

FIG. 10 is a sectional view taken generally along lines 10—10 of FIG. 7.

DETAILED DESCRIPTION OF THE DRAWINGS

Figure 1:
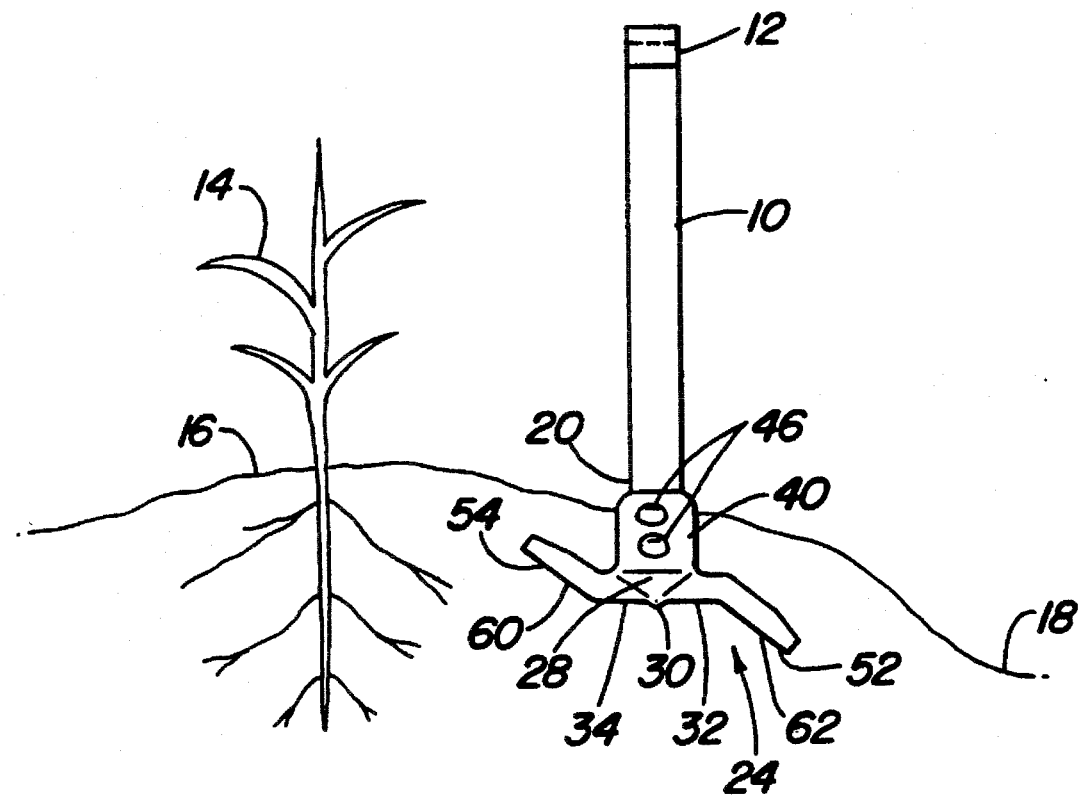
FIG 1 is a front view of a row side sweep connected to a cultivator shank and operating adjacent a row of crop.
Figure 2:
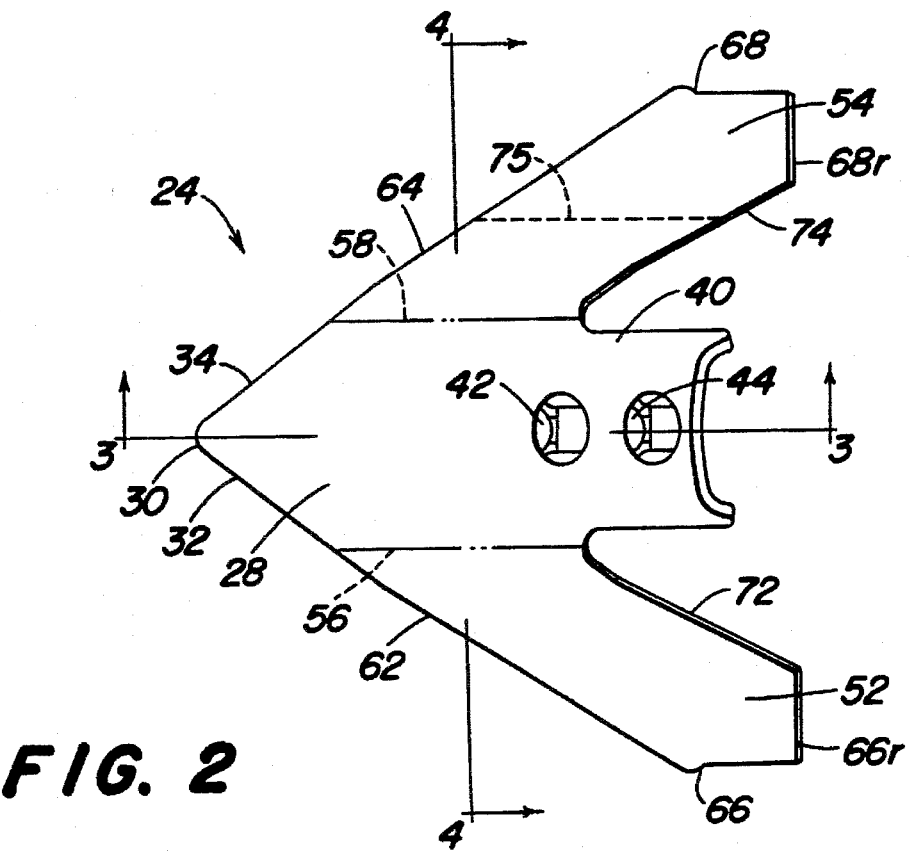
FIG. 2 is an enlarged top view of the sweep of FIG. 1.

Referring now to FIG. 1, therein is shown a cultivator shank 10 having an upper connecting end 12 adapted for connection to a cross tube of a conventional row crop cultivator rig or the like (not shown) for forward movement between rows of crop 14 growing in beds 16 on either side of a lower row middle 18. The shank 10 includes a tool-receiving end 20 having a pair of spaced apertures for mounting a sweep 24.

Figure 3:
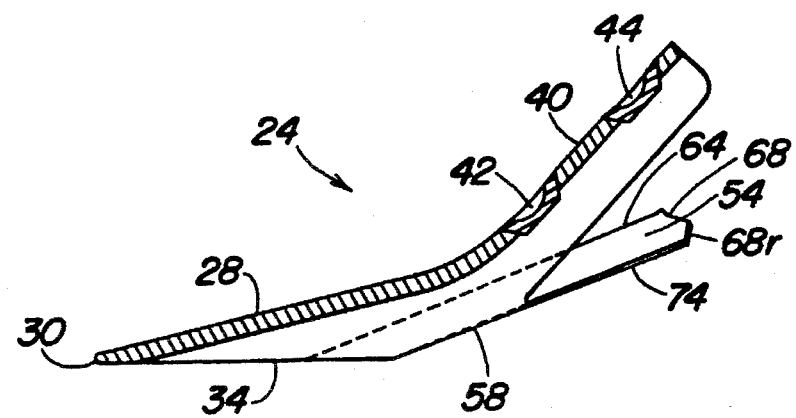
FIG. 3 is a sectional view taken generally along lines 3—3 of FIG. 2.
Figure 4:
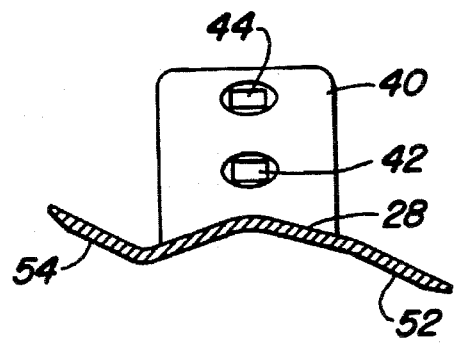
FIG. 4 is a sectional view taken generally along lines 3—3 of FIG. 2 with portions of the sweep removed to more clearly illustrate the cross section of the sweep.

As shown in FIGS. 1–4, the sweep 24 includes a central body portion 28 having a forward point 30 and leading edges 32 and 34 diverging rearwardly from the point and lying substantially in a horizontal plane (FIG. 3). The body portion 28 is concave downwardly and extends upwardly in the rearward direction to a central, upwardly angled connecting portion 40 which is rearwardly concave and includes apertures 42 and 44 adapted to align with corresponding apertures in the tool-receiving end 20 of the shank 10. Bolts 46 (FIG. 1) inserted through the apertures secure the sweep 24 to the shank 10 with the body portion 28 in a generally horizontal attitude so that the leading edges 32 and 34 are substantially horizontal.

Left-hand and right-hand (as viewed in the direction of travel in FIG. 2) wings 52 and 54 extend outwardly and rearwardly from the corresponding sides of the central body portion 28. The left-hand wing 52 is angled downwardly at a bend location indicated generally at 56 which extends in the fore-and-aft direction from the outer extremity of the connecting portion 40. The right-hand wing 54 is angled upwardly at a bend location indicated generally at 58 which extends in the fore-and-aft direction from the opposite outer extremity of the connecting portion 40. Wing leading edges 62 and 64 extend downwardly and upwardly, respectively, in the rearward direction from junctures with the leading edges 32 and 34 to wing ends 66 and 68. Wing trailing edges 72 and 74 extend from the bend locations 56 and 58 rearwardly to the ends 66 and 68. The wing ends 66 and 68 include generally transversely extending aft portions 66r and 68r. Prior to the wings 52 and 54 being bent about the lines 56 and 58, the trailing edges 72 and 74 are elevated relative to the corresponding leading edges 62 and 64. Preferably, the sweep is fabricated in such a manner that a fore-and-aft extending line (see 75 of FIG. 2) connecting a point anywhere on the leading edges 62 and 64 with a corresponding point on the trailing edges 72 and 74 will define a constant angle of approximately 12.5 degrees from a horizontal plane. This constant angle configuration provides the same soil lift regardless of contact point along the edges 62 and 64. Providing such a constant angle relative to any point on the leading edges 62 and 64 requires that the area of the wings outwardly of the bend locations 56 and 58 be specifically shaped, since simply bending the wings of a conventional flat sweep without providing a generally constant angle from front to rear edge in the direction of travel results in excessive and unacceptable soil disturbance.

The wings 52 and 54 are bent about the bend lines 56 and 58 at generally equal but opposite angles of preferably more than about 20 degrees to closely match the profile of the ground from the row bed 16 to a location adjacent the row middle 18. As shown in FIG. 1, the wings 52 and 54 are bent about 27 degrees from the horizontal. A left-hand sweep 24 is shown in FIGS. 1–4. A right-hand sweep is similar in construction to and is essentially a mirror image of the sweep 24 and so will not be described in further detail.

Figure 5:
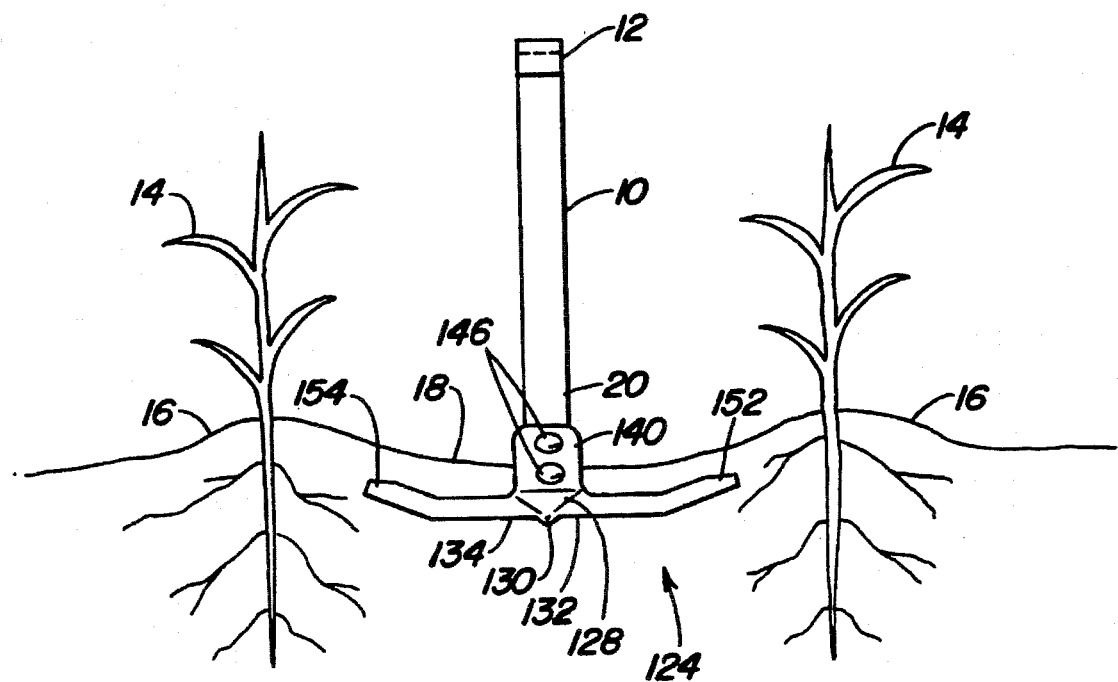
FIG. 5 is a front view of a wide sweep having upturned wing ends, the sweep connected to a cultivator shank for operating between rows of crop.

A sweep 124 is shown in FIGS. 5–10 which has a width sufficient to extend from one bed 16 to the adjacent bed (FIG. 5). The sweep 124 includes a central body portion 128 having a forward point 130 supported for movement through the soil in the row middle 18. Leading edges 132 and 134 diverge rearwardly from the point 130 and lie substantially in a horizontal plane. The body portion 128 is concave downwardly and extends upwardly in the rearward direction to a central, upwardly angled connecting portion 140 with apertures 142 and 144 adapted to align with corresponding apertures in the tool-receiving end 20 of the shank 10. Bolts 146 (FIG. 5) inserted through the apertures secure the sweep 124 to the shank 10 with the body portion 128 supported such that the leading edges 132 and 134 are substantially horizontal.

Left-hand and right-hand wings 152 and 154 extend outwardly and rearwardly from the corresponding sides of the central body portion 128. At bend locations 156 and 158, the wings 152 and 154 are bent upwardly about fore-and-aft extending bend lines. The bend locations 156 and 158 correspond generally to the location where the plant 16 beds begin to rise from the middle area 18 (FIG. 5).

The wings 152 and 154 include leading edges 162 and 164 extending from the edges 132 and 134 and terminating at wing ends 166 and 168. Trailing edges 172 and 174, which are elevated relative to the leading edges, extend rearwardly from the connecting portion 140 to the ends of the wings. Preferably, a fore-and-aft extending line (see 175 of FIGS. 7 and 8) connecting a point anywhere on the leading edges 162 and 164 with a corresponding point on the trailing edges 172 and 174 will define a constant angle of approximately 12.5 degrees from horizontal to provide the same soil lift regardless of contact point along the edges 162 and 164. The profile of the sweep 124 approximates the ground profile between the rows of plants 14 for more uniform depth of penetration, reduced soil throw and moisture loss, less crop root damage, and reduced draft.

The configurations of the sweeps 24 and 124 described above provide uniform depth of penetration, reduced soil throw and moisture loss, less crop root damage, and reduced draft. The improved sweep configurations with the constant angle between any point on the leading edges and the corresponding point on the trailing edges also provides soil flow similar to that of a flat sweep and permits cultivation closer to the plant without plant damage or destruction of the desired bed profile.

Having described the preferred embodiment, it will become apparent that various modifications can be made without departing from the scope of the invention as defined in the accompanying claims.

We claim:

1. A cultivator sweep for row crop cultivation between rows of crops, wherein adjacent rows of crops are spaced a preselected distance apart and include plant beds that are higher than a middle area between the rows and define with the middle area a ground profile between adjacent rows of the plants, the sweep having a preselected working width and comprising:

a body having a point and a central lowermost portion, the body adapted for support by a shank with the lowermost portion being substantially horizontal;

a first wing extending outwardly from the body and adapted for working the soil around the plant bed;

wherein the first wing includes an inwardmost section generally level with the lowermost portion of the body, and an outermost portion angled upwardly from the inwardmost section about a generally straight and fore-and-aft extending bend line to generally match the ground profile of the plant bed so that the depth of the cultivation remains generally constant in the plant bed; and wherein the first wing has a leading edge and a trailing edge, and a fore-and-aft extending line connecting a point on the leading edge with a point on the trailing edge lies at a substantially constant angle relative to a horizontal plane in both the inwardmost section and outermost portion of the first wing to provide constant soil lift along the wing.

2. The as set forth in claim 1 further including a second wing extending outwardly from the body on the side of the body opposite the first wing and having inwardmost and outermost sections, wherein the working width is approximately equal to but slightly less than the preselected row spacing so that the entire area between adjacent rows of plants is cultivated by the sweep, the outwardmost section of the second wing angled upwardly so that the first and second wings generally match the ground profile of the plant beds of the adjacent rows on either side of the sweep.

3. The invention as set forth in claim 2 wherein the first and second wings extend horizontally outwardly from the body to bend locations located near the outer ends of the first and second wings.

4. The invention as set forth in claim 3 wherein the outermost sections of the wings are bent up about the bend lines at angles of greater than at least 15 degrees from the horizontal.

5. A cultivator sweep for row crop cultivation between rows of crops, wherein adjacent rows of crops are spaced a preselected distance apart and include plant beds that are higher than a middle area between the rows and define with the middle area a ground profile between adjacent rows of the plants, the sweep having a preselected working width and comprising:

a body having a point and a central lowermost portion, the body adapted for support by a shank with the lowermost portion being substantially horizontal;

a first wing extending outwardly from the body and adapted for working the soil around the plant bed;

wherein the first wing includes an inwardmost section generally level with the lowermost portion of the body, and an outermost portion angled upwardly from the inwardmost section to generally match the ground profile of the plant bed so that the depth of the cultivation remains generally constant in the plant bed; and wherein the point is adapted for working a portion of the plant bed, and further including a second wing extending outwardly from the body on the side of the body opposite the first wing, the second wing including a portion bent downwardly from the lowermost portion of the body for working the soil adjacent the middle area.

6. The invention as set forth in claim 5 wherein the body extends upwardly to a shank-engaging portion adapted for fixing the sweep to a shank, and wherein the first and second wings include first and second bend locations immediately adjacent the shank engaging portion.

7. The invention as set forth in claim 6 wherein the bend locations define fore-and-aft extending bend lines, and wherein the wings outwardly of the bend locations are bent at generally equal but opposite angles from the horizontal.

8. The invention as set forth in claim 7 wherein the wings are bent at angles of greater than 20 degrees from the horizontal.

9. A row side sweep for cultivating soil adjacent a row of plants growing in an elevated bed having a preselected bed profile, the row side sweep including a central portion having a leading point, a row side wing extending outwardly from the central portion and angled upwardly from the horizontal at an acute angle to approximate the preselected bed profile, and further including a second wing opposite said row side wing and extending outwardly from the central portion and angled downwardly from the horizontal at an acute angle to approximate a portion of the bed profile on the side of the point opposite the row side wing.

10. The invention as set forth in claim 9 wherein the central portion includes leading sweep edges diverging rearwardly from the point, and wherein the leading sweep edges lie generally in a horizontal plane.

11. The invention as set forth in claim 9 wherein the central portion includes leading sweep edges diverging rearwardly from the point, and wherein the leading sweep edges lie generally in a horizontal plane and the row side wing and the second wing have leading wing edges angled upwardly and downwardly, respectively, from the leading sweep edges.

12. The invention as set forth in claim 9 wherein the wings are bent at generally equal but opposite angles of greater than 20 degrees from the horizontal.

13. The invention as set forth in claim 9 wherein the first and second wings are bent about fore-and-aft extending bend lines and provide soil flow closely approximating the soil flow of a flat sweep.

14. The invention as set forth in claim 13 wherein the sweep includes a connecting portion extending rearwardly and upwardly from the point, and wherein the bend lines are located closely adjacent the connecting portion.

15. The invention as set forth in claim 10 wherein the row side wing includes a leading edge portion and a trailing edge portion, wherein a fore-and-aft extending line connecting a point anywhere on the leading edge portion with a corresponding point on the trailing edge portion lies at a substantially constant angle relative to a horizontal plane to provide constant soil lift regardless of soil contact point along the leading edge.

16. A sweep for cultivating soil between adjacent rows of plants growing in elevated beds with a shallow row middle between the beds, wherein a pair of adjacent elevated beds and a row middle therebetween generally define a preselected soil profile, the sweep including a central portion having a leading point adapted for working the soil in the row middle, a first wing extending outwardly from the central portion to a first sweep end adapted for working the soil in one of the elevated beds, and a second wing extending outwardly from the central portion to a second sweep end adapted for working the soil in the other of the elevated beds, the first and second wings being angled upwardly from the horizontal at an acute angle to approximate the preselected soil profile for working the soil at generally a constant depth from the first sweep end to the second sweep end, and wherein a fore-and-aft extending line extending along surfaces of the first and second wings lie at a substantially constant angle relative to a horizontal plane to provide constant soil lift along the wing.

17. The invention as set forth in claim 16 wherein the central portion includes leading sweep edges diverging rearwardly from the point, and wherein the leading sweep edges lie generally in a horizontal plane.

18. The invention as set forth in claim 17 wherein the leading sweep edges lie generally in a horizontal plane and the first and second wings have leading wing edges angled upwardly from the leading sweep edges to permit cultivation closer to the plant without plant root damage or destruction of the bed profile.

19. The invention as set forth in claim 18 wherein the wings are bent at generally equal angles of greater than about 15 degrees from the horizontal.

20. The invention as set forth in claim 16 wherein the first and second wings are bent about fore-and-aft extending bend lines at a location corresponding generally to the locations where the elevated beds join the row middle.

21. The invention as set forth in claim 16 wherein the wings each include a leading edge portion and a trailing edge portion, wherein the fore-and-aft extending line connecting a point anywhere on the leading edge portion with a corresponding point on the trailing edge portion lies at an angle of approximately 12.5 degrees relative to a horizontal plane to provide the constant soil lift regardless of soil contact point along the leading edge portion.

22. A cultivator sweep for cultivating soil between rows of crops planted in plant beds of preselected profile, the sweep adapted for operation at depths above deep-tillage levels to prevent damage to crop roots, the sweep including a central portion having a leading point for moving through the soil at a preselected level, a wing extending outwardly from the central portion, the wing including a leading edge portion adapted for movement through the soil in a forward direction at a level offset vertically from the preselected level, wherein the wing is angled from the horizontal at a bend location along a generally fore-and-aft extending line to approximate the preselected profile for a generally constant operating depth in the plant beds, and wherein the wing includes a trailing edge portion offset from the leading edge portion, and wherein a line extending in the forward direction and connecting a point anywhere on the leading edge portion with a corresponding point on the trailing edge portion is angled upwardly from a horizontal plane at a substantially constant angle to provide substantially constant soil lift regardless of a contact point between the soil and the leading edge portion to minimize soil throw and prevent damage to plants in the rows.

23. The invention as set forth in claim 22 wherein the constant angle is approximately 12.5 degrees.

* * * * *